(12) United States Patent
Hird et al.

(10) Patent No.: US 10,223,690 B2
(45) Date of Patent: Mar. 5, 2019

(54) ALTERNATIVE ACCOUNT IDENTIFIER

(71) Applicant: CA, Inc., Islandia, NY (US)

(72) Inventors: Geoffrey R. Hird, Cupertino, CA (US); Douglas N. Hoover, Sunnyvale, CA (US)

(73) Assignee: CA, Inc., Islandia, NY (US)

( * ) Notice: Subject to any disclaimer, the term of this patent is extended or adjusted under 35 U.S.C. 154(b) by 822 days.

(21) Appl. No.: 14/092,921

(22) Filed: Nov. 27, 2013

(65) Prior Publication Data

US 2016/0189138 A1  Jun. 30, 2016

(51) Int. Cl.
*G06Q 40/00* (2012.01)
*G06Q 20/34* (2012.01)
*G06Q 20/38* (2012.01)

(52) U.S. Cl.
CPC .......... *G06Q 20/34* (2013.01); *G06Q 20/385* (2013.01)

(58) Field of Classification Search
CPC ........................................................ G06Q 20/34
USPC ........................................................... 705/44
See application file for complete search history.

(56) References Cited

U.S. PATENT DOCUMENTS

2012/0024946 A1* 2/2012 Tullis ................. G06Q 20/385
235/379

* cited by examiner

*Primary Examiner* — Edward Chang
(74) *Attorney, Agent, or Firm* — Alliance IP, LLC

(57) ABSTRACT

Payment instrument data is received in connection with a transaction, the data including an alternative primary account number (PAN) and an account identifier. A permanent PAN of an account is identified that is based on the account identifier. An alternative PAN associated with the permanent PAN is derived to determine whether the received alternative PAN matches the derived alternative PAN associated with the permanent PAN.

9 Claims, 8 Drawing Sheets

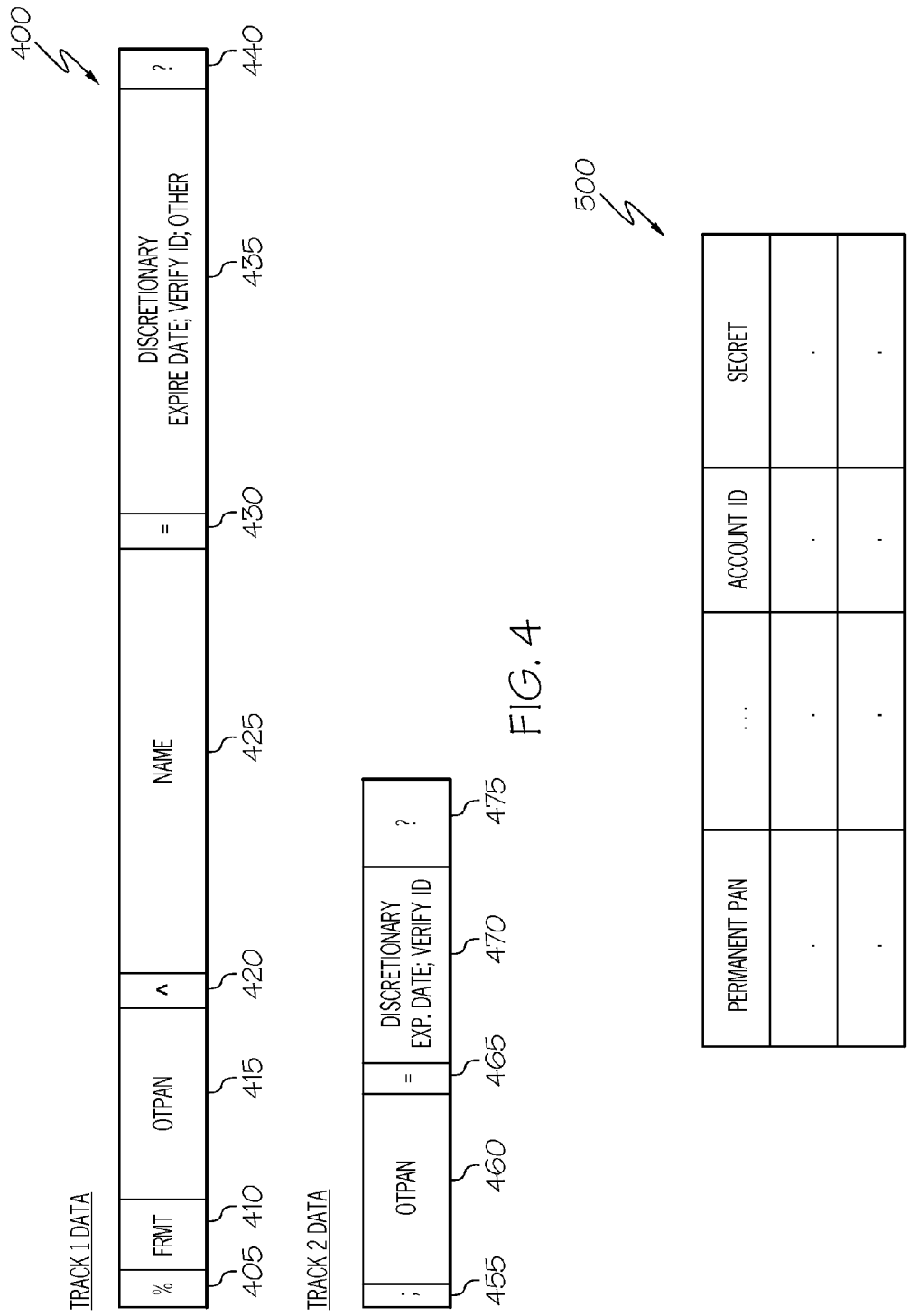

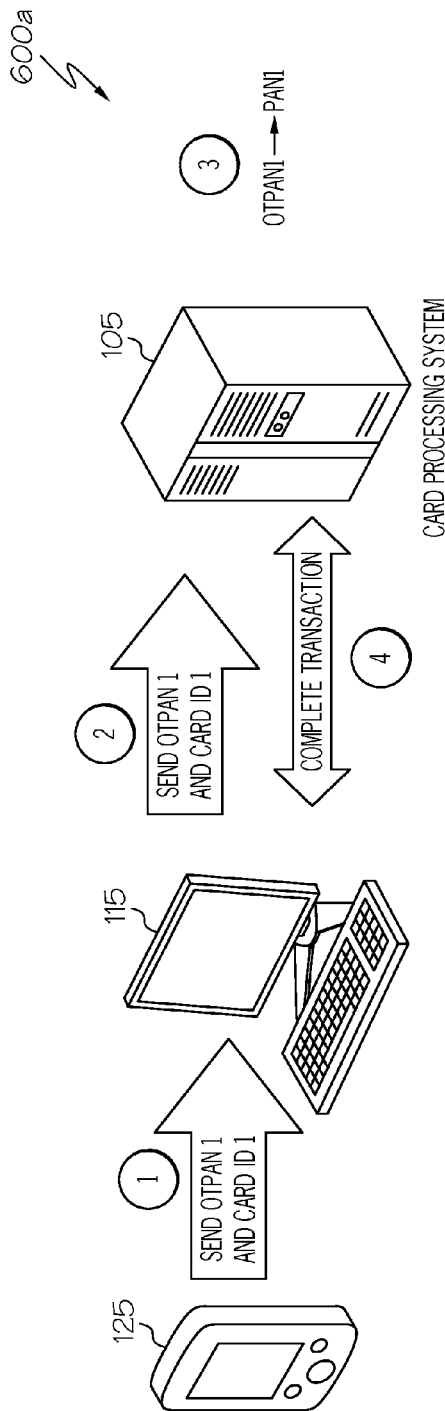
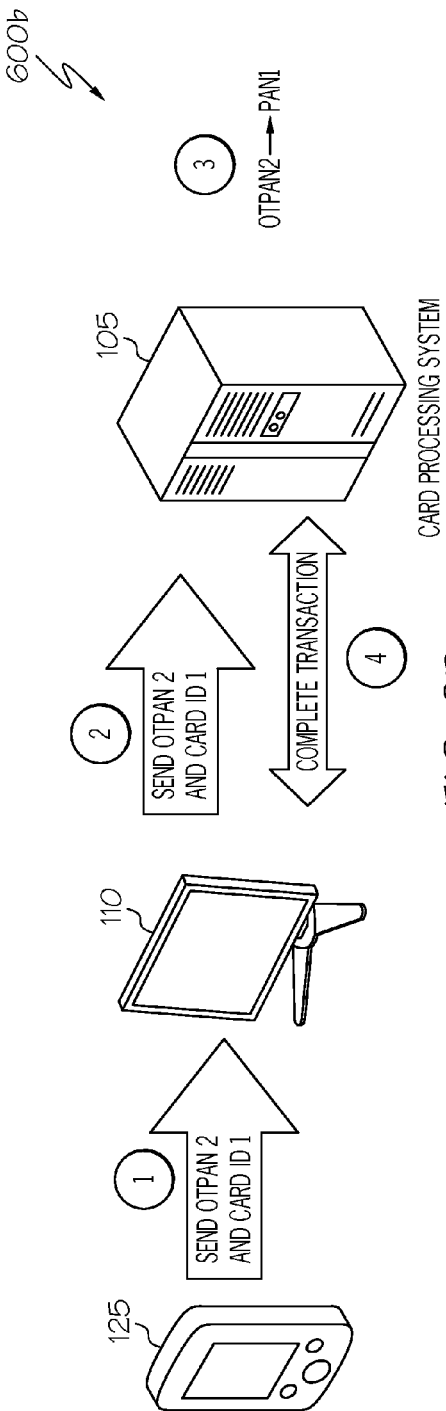

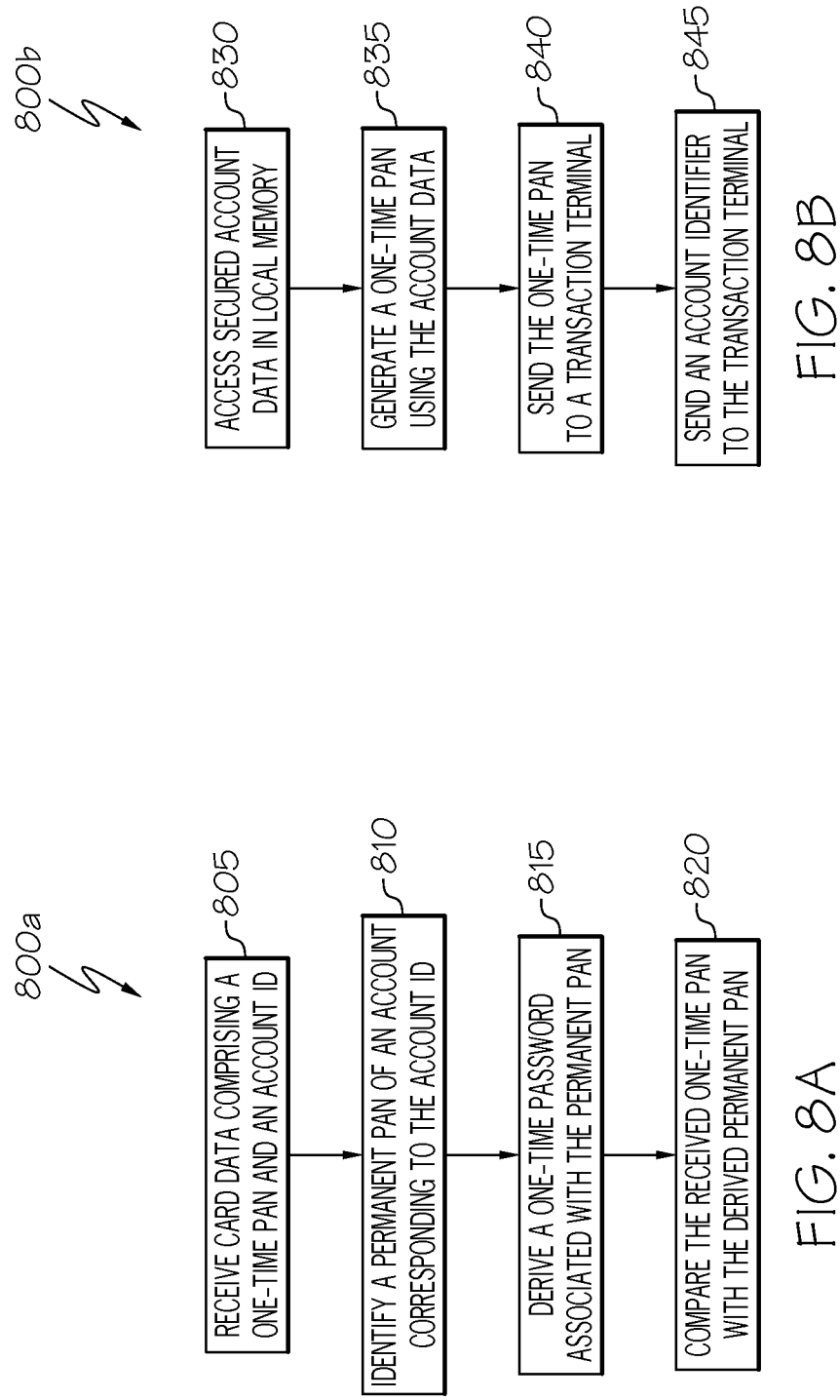

ALTERNATIVE ACCOUNT IDENTIFIER

BACKGROUND

The present disclosure relates in general to the field of computing systems, and more specifically, to electronic payment systems.

A smart card, integrated circuit card (ICC), or "chip card" are pocket-sized cards with embedded integrated circuits. Such chip cards (or the integrated circuits of such chip cards) have been embedded in some smartphones and other mobile computing devices. The chip cards can provide identification, authentication, data storage, and application processing and have been used in connection with electronic payment, such as credit, debit, public transport, and phone cards, as well as other identification schemes, such as health insurance, school, and other government identification. Chip cards can include contact and contactless chip cards. A contact chip card can be activated when contact pads of the chip card are brought into contact with a card reader. A contactless chip card communicates with and is powered by a reader through radio frequency (RF) induction technology when the card is brought into proximity to an antenna of the reader.

All of the major payment card brands have begun supporting payment using mobile devices at merchant point-of-sale (POS) terminals. The Europay, Mastercard, and Visa (EMV) consortium previously defined standards for chip cards, which are rectangular plastic cards containing a chip. EMV has adapted these standards to mobile devices that communicate with a merchant POS terminal via Near Field Communication (NFC). The cardholder data and algorithms that were in a chip card are now supported in mobile devices, such as common mobile "smart" phones. Accordingly, a "card" can also refer to a payment instrument implemented on a mobile device, even though there is no rectangular plastic card.

BRIEF SUMMARY

According to one aspect of the present disclosure, payment instrument data can be received in connection with a transaction, the data including an alternative primary account number (PAN) and an account identifier. A permanent PAN of an account can be identified that is based on the account identifier. An alternative PAN associated with the permanent PAN can be derived to determine whether the received alternative PAN matches the derived alternative PAN associated with the permanent PAN.

BRIEF DESCRIPTION OF THE DRAWINGS

FIG. 4 illustrates example track data from a payment device in an example transaction in accordance with at least one embodiment;

FIG. 5 illustrates an example table including data for use in deriving a one-time card identifier in accordance with at least some embodiments;

FIGS. 6A-6B are simplified block diagrams illustrating an example payment using a one-time card identifier in accordance with at least some embodiments;

FIGS. 8A-8B are simplified flowcharts illustrating example techniques in connection with payment using a one-time card identifier in accordance with at least some embodiments.

Like reference numbers and designations in the various drawings indicate like elements.

DETAILED DESCRIPTION

Figure 1:
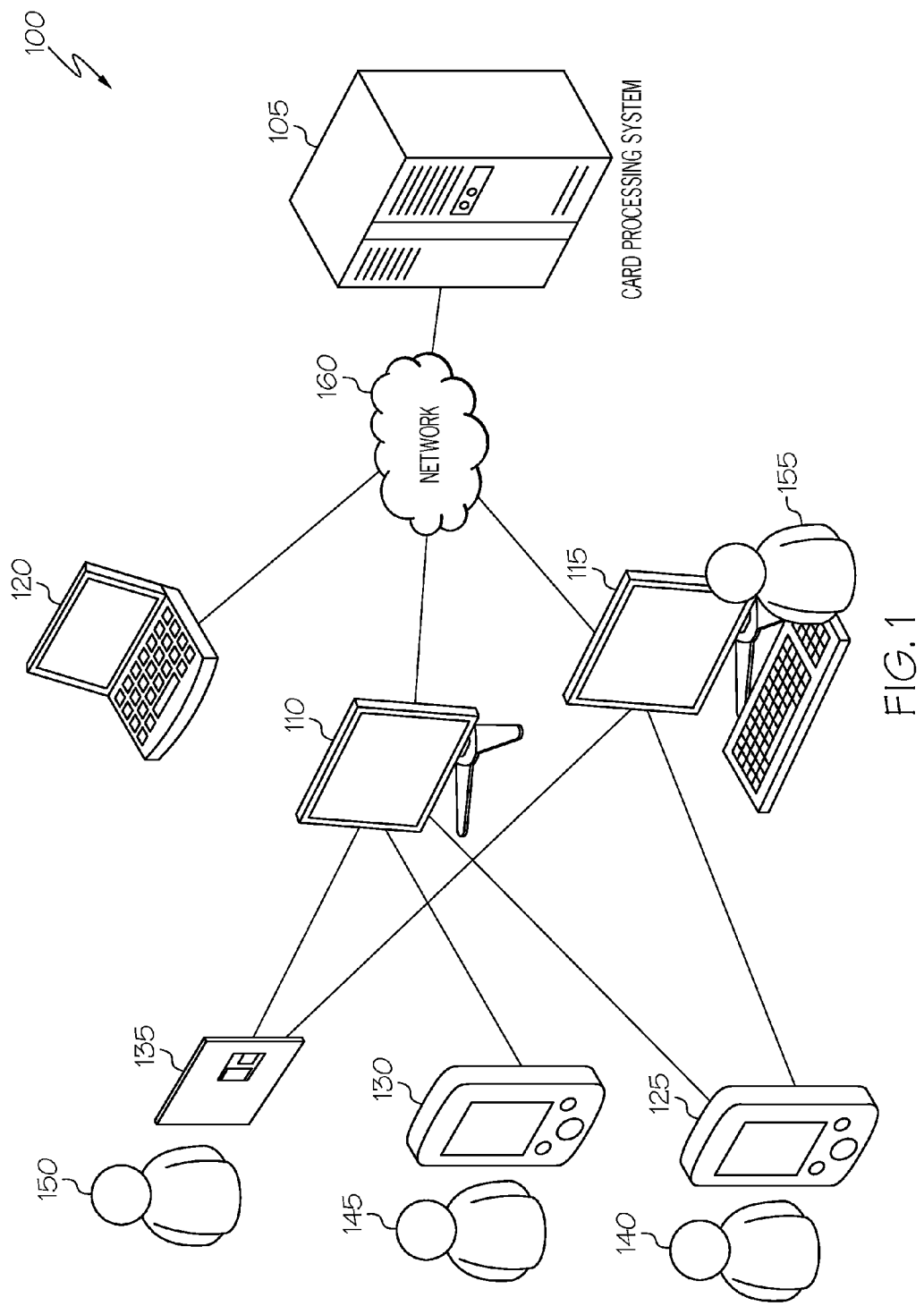
FIG. 1 is a simplified schematic diagram of an example computing system including an example card processing system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 is a simplified block diagram illustrating an example computing environment 100 including a card payment processing system 105, transaction terminals 110, 115, 120, and user payment devices 125, 130, 135 equipped with functionality for generating one-time card identifiers, such as one-time primary account numbers (PANs), for use in transactions at transaction terminals 110, 115, 120. In one example, payment devices 125, 130, 135 can each be associated with one or more users (e.g., 140, 145, 150) and corresponding card payment accounts, each with a permanent card identifier. Secret data, such as seed data, can be stored on the payment devices 125, 130, 135 together with firmware and/or software logic for generating one-time card identifiers, for instance, from the secret data.

A user (e.g., 140, 145, 150) can present their payment device at a transaction terminal (e.g., 110, 115) in some cases managed by users (e.g., 155) employed by a store or other enterprise to conduct the transaction with the users (e.g., 140, 145, 150). Transaction terminals (e.g., 110) can also include unmanned, automated point-of-sale systems, such as kiosks and other systems. Additionally, users (e.g., 140, 145, 150) can conduct e-commerce transactions by interfacing with online storefronts using other personal communication devices (e.g., 120) connected to one or more networks (e.g., 160), including the internet. For instance, a one-time card identifier can be generated and presented on a payment device (e.g., 130) for entry by a user (e.g., 145) at personal communication device 120 in connection with an ecommerce transaction, among other examples.

Payment devices, or user devices, (e.g., 125, 130, 135) can include dedicated payment devices (e.g., 135), such as chip cards equipped with data and executable logic for generating a one-time card identifier or other identifier that can hide the true card identifier, such as the card's permanent PAN, from third parties that could potentially misuse the permanent PAN. Payment devices can also include multi-functional personal computing devices (e.g., 125, 130), such as smartphones, tablet computers, laptop computers, personal digital assistant (PDA) devices, and other user computer devices, that include, among other functionality, chip card or other payment device functionality, permitting the device (e.g., 125, 130) to be presented at a transaction and, in some cases, interface with a transaction terminal (e.g., 110, 115), among other examples.

In general, "servers," "payment devices," "user devices," "mainframes", "computing devices," "network elements," "hosts," "clients," "communication devices," "computers," and "systems," etc. (e.g., 105, 110, 115, 120, 125, 130, 135, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 115, 120, 125, 130, 135, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, card processing system 105, or other system or subsystem of an example computing environment (e.g., 100) can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, subsystem, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Electronic payment instruments can includes "cards" and other data and logic used to communicate with terminals to complete a transaction, including transactions that do not necessarily involve a "payment", such as instruments used to withdraw funds from an account, verify a prior payment or authorization (e.g., using the instrument to board public transportation, serve as a library card, etc.), among other many other transaction examples). The logic and data of a payment instruments can be implemented in a personal computing device such as a smart phone, tablet, or other mobile computing device, among other examples. As such personal computing devices are used to carry ever more sensitive data and perform transactions that potential expose its user to theft, hacking, or other injury, additional security can be provided on such devices.

A payment instrument on a mobile computing device (referred to sometimes herein simply as a "card") can be used at a merchant transaction terminal (or "terminal"), such as a point-of-service (POS) device, kiosk, automated teller machine (ATM), or other system. While much of the discussion herein references examples involving point-of-sale terminal and transactions, it should be appreciated that the concepts discussed herein also pertain to other systems supporting the use of other payment mechanisms, such as banking cards, public transportation cards, theme park cards, and other examples.

During a transaction in which a card or other payment instrument implemented on a payment device is used by a user to withdraw money, purchase a good or service, etc. or otherwise engage in a transaction with another party, a terminal and the card can exchange several messages and negotiate whether the transaction will be performed, and if so, how it will be performed. A variety of protocols can be utilized to define the exchange of messages and the negotiation between a terminal and the card. One such example is the Europay, MasterCard- and Visa (EMV) standard for interoperation of cards and card capable terminals. In connection with the transaction messages, the payment device can send an identifier of the payment device to the terminal for use by the terminal in authenticating the payment device with an issuer of the payment device, among other examples. Some identifiers, such as the card PAN, are sensitive information that should be exposed as little as possible. Providing an identifier like the PAN, to a merchant or terminal involves a level confidence in the trustworthiness of the merchant or terminal system. Incidents have occurred where cardholders' PANs have been misused resulting in identity theft, replay attacks, unauthorized transactions, and other injuries to the cardholders, among other example issues.

Example payment systems described herein can resolve at least some of the issues discussed above, among other examples. For instance, an improved payment system and payment instrument can address the security of the card data storage on the mobile payment device as well as the security of the transaction data as it travels between the cardholder's device and the merchant reader, and beyond, during a transaction, among other potential advantages. For instance, a payment instrument and supporting card payment processing system can be provided that can utilize card identifiers that hide the permanent card identifier associated with the account from third parties, including merchants and other entities participating in transactions with the payment device. The alternative card identifier, such as a one-time PAN, can be presented and used at the terminal and can be accepted by the issuer (e.g., using the supporting card payment processing system) and resolved into the corresponding card identifier for use in authenticating the payment instrument, the alternative card identifier, and, with it, the transaction. The alternative card identifier can be used in transactions involving a variety of payment protocols including variants of the EMV standard, magstripe style protocols, and other variants not yet codified. Adoption of such payment instruments supporting generation of alternative card identifiers can be simple with legacy terminals interacting with the payment instrument (through the payment device hosting the payment instrument) as with any other legacy payment instruments in some examples. Masking a cardholder's card identifier, such as the true, permanent PAN of the payment instrument, can additionally provide enhanced security for digital transactions, among other example advantages.

Figure 2:
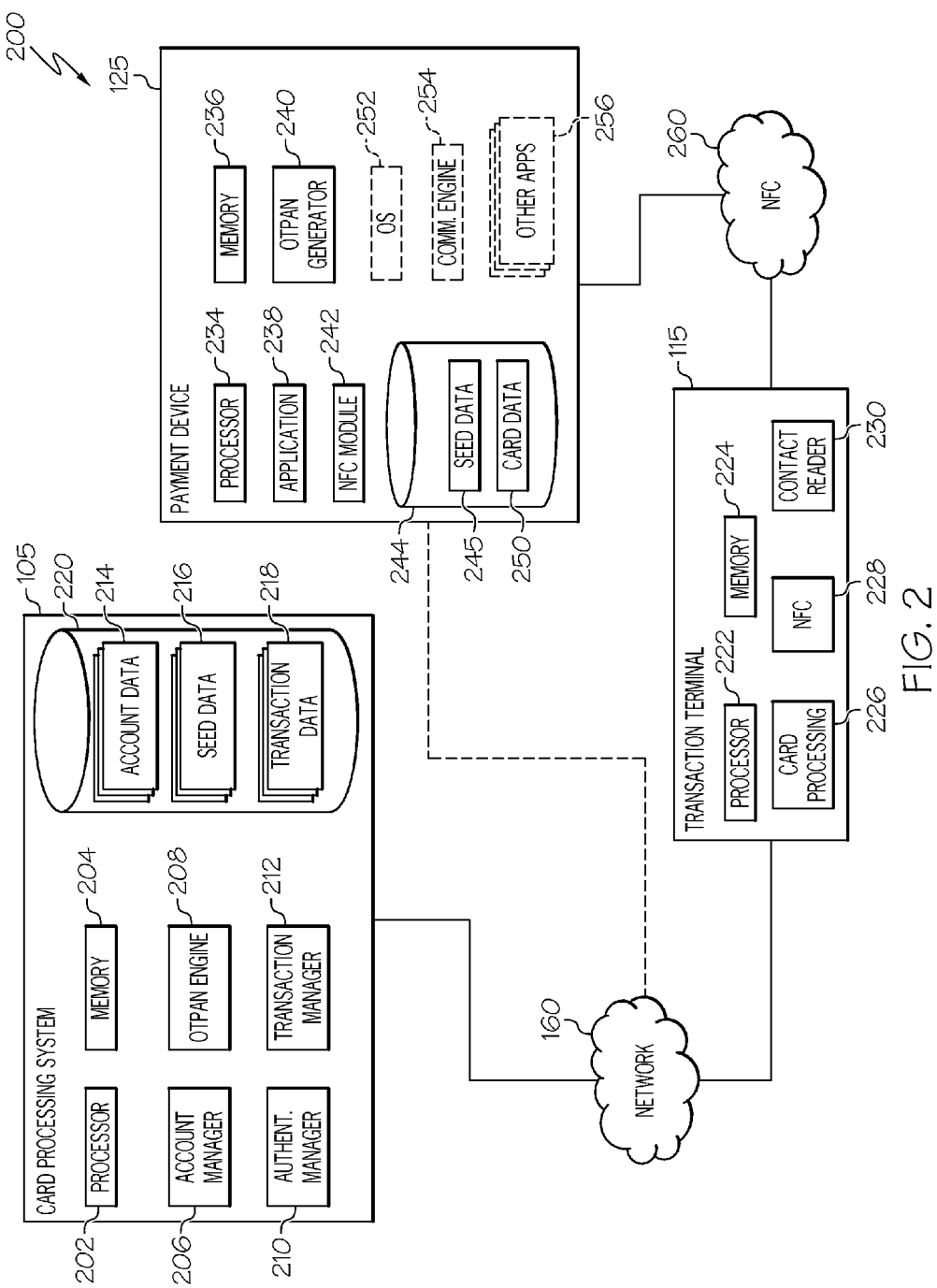
FIG. 2 is a simplified block diagram of an example computing system including an example card processing system, an example payment device, and an example transaction terminal in accordance with at least one embodiment.

Turning now to the simplified block diagram of FIG. 2, an example implementation of a payment system 200 is illustrated including an example card processing system server 105, one or more payment devices (e.g., 125), and one or more transaction terminals (e.g., 115). In one example, card processing system 105 can include one or more data processing apparatus 202, one or more memory elements 204, and computer executable logic embodied, in some instances, in one or more software and/or hardware-based logic components, including, for example, an account manager 206, one-time PAN (OTPAN) generator 208, authentication manager 210, and transaction manager 212, among potentially other components and combinations of the foregoing. In one example, an example account manager 206 can manage multiple card holder accounts together with account data 214 and other data (e.g., 216, 218) in one or more data stores or structures (e.g., 220). In some instances, account manager 206 can modify account data 214 (and in some cases transaction data 218) based, for instance, on authenticated user- or issuer-provided requests and feedback, among other examples. Account data 212 can be maintained by the issuer of an account associated with a payment instrument hosted on a payment device and can include records of account numbers (e.g., the permanent PAN), sponsoring financial institutions, cardholder name and personal information, expiration date, credit limit and availability information, information identifying the type of the payment device, payment protocols supported by the payment instrument, among other information. In some cases, account information can further include an account identifier, such as a user identifier, device identifier, card identifier, or other identifier associated with the payment instrument account that can be used to map alternative primary account identifiers, such as OTPANs, to a cardholder account. Seed data 216, or other secret data, can be maintained for one or more of the cardholder accounts supporting generation of a OTPAN. Respective seed data 216 can be indexed to, mapped to, or otherwise associated with its account. Transaction data 218 can also be maintained for each account, the transaction data 218 describing aspects of transactions attempted or completed using a respective cardholder account, among other examples.

In some implementations, OTPANs can be generated by payment devices (e.g., 125), with the OTPAN varying randomly or pseudo-randomly from transaction to transaction making it difficult or impossible to reuse the PAN (i.e., the OTPAN) presented at a transaction in an unauthorized fashion. A OTPAN can be generated using seed data (e.g., 216, 245) and a one-time password algorithm such as time-based one-time password (TOTP)-type scheme or a keyed-hash message authentication code (HMAC)-based one-time password (HOTP)-type scheme, among other examples. A OTPAN engine of the card processing system 105 can include logic for applying the various OTPAN generation that may be used by payment devices (e.g., 125) supported by the card processing system 105.

A card processing system 105 can communicate with transaction terminals (e.g., 115) that conduct transactions with payment instruments of payment devices (e.g., 125) supported by the card processing system 105. For example, payment protocols, such as EMV, can include authentication and/or authorization steps that involve the terminal (e.g., 115) passing account information received from the payment device (e.g., 125) for verification, authorization, and/or authentication by the payment instrument's issuer (e.g., using the card processing system 105). Account information received by the terminal 115 can include a OTPAN or other alternative primary account identifier that can be resolved by the card processing system 105 into a permanent, or true, primary account identifier, such as a permanent PAN of the account. Authentication manager 210 can identify the type of account from the information and determine how to properly resolve an alternative primary account identifier into the true primary identifier for the account. For instance, a OTPAN can be received from a terminal in a transaction together with an account identifier. The authentication manager 210, in some implementations, can use the account identifier to identify an account and an alternate account identifier scheme associated with the identified account. For instance, the authentication manager 210 can map a received account identifier to an account that uses a counter-based one-time password scheme and corresponding seed data to generate OTPANs in transactions. In such an instance, the authentication manager 210 can use the OTPAN engine 208 to attempt to derive the OTPAN for that account and that particular transaction. If the OTPAN derived at the OTPAN engine 208 matches or is otherwise substantially equal to the OTPAN received for the account in the transaction with the terminal, the authentication manager 210 can determine that the payment instrument used by the payment device (e.g., 125) is legitimate and authenticate the transaction between the payment device (e.g., 125) and terminal (e.g., 115). Other alternative primary account identifiers can be used as an alternative or in addition to OTPAN schemes. For instance, at least a portion of an alternative primary account identifier can be regenerated randomly at each transaction and bound to an account identifier. In other instances, the account identifier can be used as the alternative primary account identifier, among other potential alternatives and examples.

As noted, card processing system 105 can be invoked in transactions between a payment device (e.g., 125) and transaction terminal (e.g., 115) in accordance with a payment protocol used between the payment device's payment instrument and transaction terminal in a transaction. A transaction manager 212 can be included to handle various aspects of transactions involving payment instruments supported by the card processing system 105. Further, transaction manager 212 can collect transaction data 218 describing the transactions, such as the identification of the merchant or entity controlling the transaction terminal, the date of the transaction, the amount of the transaction, among other examples.

An example payment device (e.g., 125) can include one or more data processing apparatus 234, one or more memory elements 236, and computer executable logic embodied, in some instances, in one or more software and/or hardware-based logic components, including, for example, one or more payment instrument applications 238 (e.g., embodying at least a portion of the payment instrument logic on the payment device 125), a OTPAN generator 240, a near field communication module 242 (or other communication interface), among potentially other examples. Payment instrument data can be maintained in one or more data stores or structures (e.g., 244) and can include cardholder account- and/or device-specific data (e.g., 245, 250) for use in transactions. For instance, account identifier data and seed data (e.g., 245) corresponding to the payment instrument can be hosted in memory of the payment device 125. In some examples, payment instrument data can be maintained in a secured container, such as a Secure Element. In other examples, such as payment devices that do not possess a Secure Element, payment instrument data can be stored in application memory of the device, such as by cryptographically camouflaging or encrypting the data to limit its accessibility to unauthorized applications (e.g., 256) or users of the payment device 125, among other examples.

As noted above, in some implementations, payment devices (e.g., 125) can include dedicated payment devices, while others can include multi-function devices that include payment device functionality, such as chip card-equipped smart phones and other personal computing devices. In some example, multi-function devices can include further components such as an operating system 252, communication engine 254 (for communicating with other devices over one or more networks (e.g., 160) using wireless or wireline channels), and other applications and programs (e.g., 256), among potentially many other devices and components, such as cameras, speakers, touchscreen displays, telephony modules, etc. Further, it should be appreciated that in some examples, a single payment device, such as a smart phone, can host multiple payment instruments (e.g., associated with multiple different accounts of the user) each with distinct payment instrument applications and/or data hosted on the payment device, among other examples.

In some examples, a payment device 125 can be presented at a transaction terminal 115 by a cardholder of the payment instrument, or card, as a mechanism for payment, account authentication, etc. In some instances, the payment device 125 can interface with a transaction terminal 115 using contactless communications, such as through a near-field communication (NFC) channel 260, allowing data intended for the payment instrument to be received and data generated, provided, and processed by the payment instrument logic (including an alternative primary account identifier) to be shared with the terminal. Accordingly, in some implementations, transaction terminals 115 can include one or more data processing apparatus 222, one or more memory elements 224, one or more software and/or hardware-based logic components, including, for example, a card processing module 226, as well as components for reading and exchanging messages with a payment device in a transaction. For instance, a terminal 115 can include one or multiple card readers, such as a NFC module 228 for communicating with a payment device over an NFC connection 260, a chip card contact reader 230, a magnetic strip reader, or other device adapted to accept or send information from or to a payment device, among other examples.

In one example, payment instrument logic (e.g., embodied in OTPAN generator 240) can utilize seed data 245 to generate a OTPAN to be used as the PAN in a transaction employing a particular payment protocol, such as EMV. The PAN can be sent to the terminal together with other information that would be sent in such a transaction, such as Track 1 and Track 2 (and Track 3) data, including cardholder name, issuer, expiration date, etc. Account identifier data associated with the particular payment instrument can also be maintained at the payment device (e.g., in card data 250) and sent by the payment device 125 to the transaction terminal 115 in the transaction. The OTPAN and account identifier data can be forwarded to the card processing system 105 in connection with the transaction. The card processing system 105 can resolve the OTPAN into the true PAN of the account by mapping the account identifier to the PAN and corresponding account seed data and re-deriving the OTPAN using the seed data to authenticate the OTPAN.

In some implementations, a OTPAN can be generated and used in a transaction even when no network connectivity is available to a payment device. In other words, the payment device can generate the OTPAN without communicating and coordinating with a supporting card processing system (e.g., 105). Some implementations of payment devices, such as payment devices implemented as smart phones, may be capable of communicating over WiFi, cellular broadband, and other data networks to interface with the card processing system 105. Indeed, in some instances, if network connectivity is available, a payment device can coordinate an alternative primary account identifier, such as a random or one-time identifier, with the card processing system over one or more networks 160 to be used in place of the actual PAN of the account. However, network connectivity can be unreliable, unsecure, or unavailable in many instances and the functionality of the payment device (e.g., 125) can allow the payment device to successfully generate a OTPAN or other alternative primary account identifier that the card processing system can properly utilize to authenticate transactions regardless of the payment device's network communication capabilities or the availability of network access.

Figure 3A:
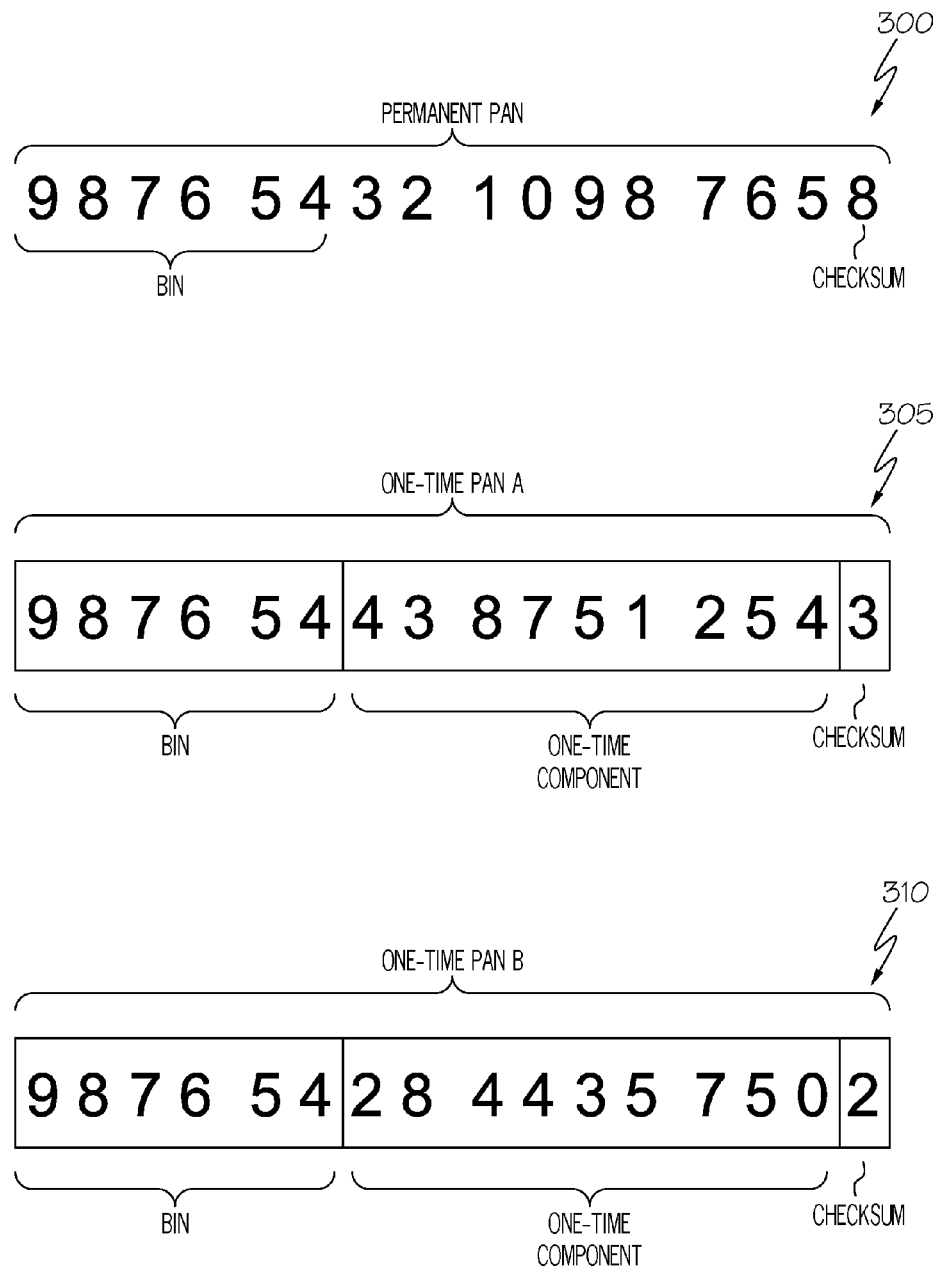
FIGS. 3A-3B illustrate an example permanent primary account identifier and example instances of one-time primary account identifiers in accordance with at least some embodiments.

Turning to the examples of FIG. 3A, an example PAN (300) is shown together with corresponding one-time PANs (OTPANs) (e.g., 305, 310) that can be generated in connection with separate transactions. In one example, the permanent PAN can be a fixed account number associated with an account that serves as the primary identifier for the account. The PAN can include a bank identification number (BIN) that can identify the issuer of the payment device, a financial institution (or other entity) sponsoring the payment device, as well as identification of the account type of the cardholder account, among other information. The permanent PAN can also include a checksum digit that can be utilized to quickly verify that the PAN is likely a valid PAN.

Rather than using the PAN in transactions, as discussed herein, one or more alternative primary account identifiers can be used in lieu of the permanent PAN (e.g., 300) to protect access to the permanent PAN. In some implementations, instances of pseudo-random OTPANs can be generated and used as the alternative primary account identifier. For instance, a different OTPAN can be generated and used for each distinct transaction involving a payment device associated with the permanent PAN. The OTPAN can be used together with an account identifier associated with a cardholder or a particular payment device associated with the cardholder's account to assist a card processing system to resolve the OTPAN into the permanent PAN.

FIG. 3A also illustrates separate example instances (e.g., 305, 310) of a OTPAN that may be generated in distinct transactions involving the payment instrument account associated with the permanent PAN. In some instances, the OTPAN can be generated to maintain a PAN format expected by a transaction terminal. For instance, a transaction terminal may include functionality for checking whether the BIN number is a valid BIN number, whether the checksum digit is accurate, etc. Accordingly, each instance of a OTPAN can include a common or other non-random and valid BIN number. In some instances, the BIN number of the OTPAN (e.g., 305, 310) can be encoded to identify (e.g., to the card processing system or even the terminal) that the OTPAN is a OTPAN (rather than the permanent PAN). The card processing system can use the BIN number to determine that the OTPAN (e.g., 305, 310) is to be resolved into the corresponding permanent PAN (e.g., 300) and can even indicate to the card processing system which scheme is employed to generate the OTPAN (or other alternative primary account identifier). Further, it should be appreciated that, while the examples of FIG. 3A show that the BIN of corresponding OTPANs is the same as the BIN of the permanent PAN, other implementations may utilize a BIN in the OTPANs that is different from the BIN of the permanent PAN (e.g., a BIN that identifies that the OTPAN is an instance of a OTPAN of a particular scheme of the payment instrument provider and not a PAN), as well as multiple different BINs for various instances (e.g., 305, 310) of OTPANs generated to represent the account of the permanent PAN (e.g., 300), among other examples.

As further shown in the examples of FIG. 3A, in addition to a BIN and checksum digit portion, an instance of a OTPAN can also include a one-time component that is generated according to one or more one-time password generation schemes. The one-time component of the OTPAN, in some implementations, may be the only pseudorandom portion of the OTPAN instances (e.g., 305, 310). One-time password generation schemes can include schemes that hash a time value or counter value against a seed value specific to the account, schemes that utilize time synchronization to determine the value of the moving one-time component, functions that derive the next one-time component from the previous one-time component generated, one-time components generated based on user challenges, among other examples, both existing and in the future. In one example, the one-time component can be generated from the Application Transaction Counter (ATC) value in systems supporting EMV-type payment protocols. The ATC value can serve as a counter value that is commonly known to the payment device and card processing system that can be hashed against a seed or other secret commonly known to the payment device and card processing system to generate instances of a OTPAN. Other counter or timer values in payment protocol messaging or tracking can also be used as moving values in the generation of OTPAN instances, among other examples.

Figure 3B:
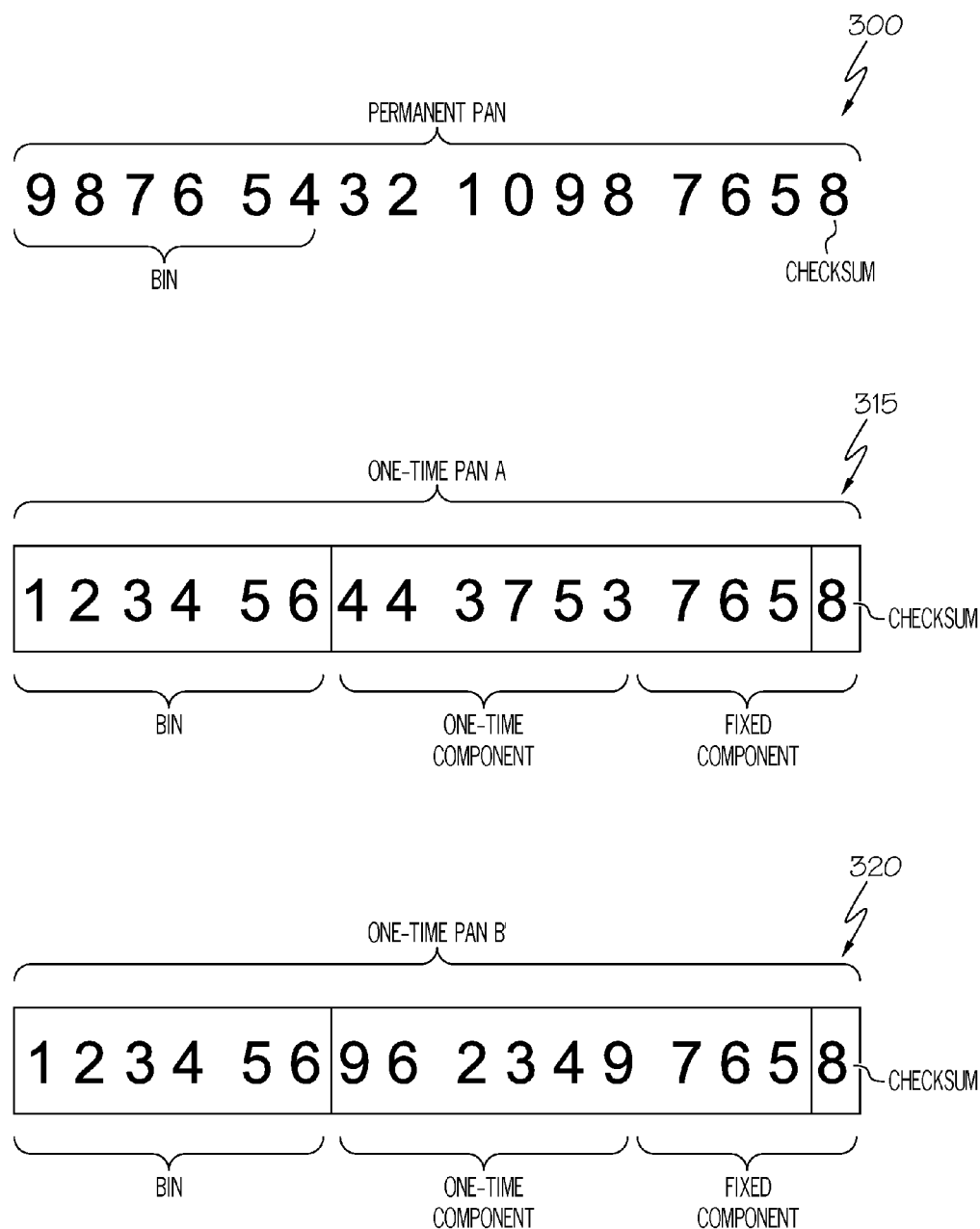

In still additional examples, instances of a OTPAN can also maintain other fixed portions (i.e., portions of the OTPAN other than the one-time component). For instance, in some cases the last four digits (including the checksum) can be used to identify the payment used by a user (e.g., on a receipt generated for the transaction). To preserve such an identifier, in some implementations, such as that illustrated in FIG. 3B, a fixed component can be defined for OTPANs (e.g., 315, 320) generated for a particular payment instrument account such that the fixed component is the same as that of the PAN. Note also in FIG. 3B, that a OTPAN-specific BIN is used in this particular example implementation that is different from the BIN of the PAN 300. In other implementations, both the BIN and fixed component of OTPANs can match that of the PAN. Further, other portions of the OTPAN can be fixed other than the last four digits, as in the example of FIG. 3B, according to the parameters and schemes of a particular corresponding payment instrument provider, among other examples.

Turning to FIG. 4, in some instances, payment devices engaged in a transaction with a transaction terminal can send account data (also referred to as "card data") to the transaction terminal in the form of track data or other data supported by the transaction terminal, a transaction protocol employed in the transaction, a transaction application agreed upon between the transaction terminal and payment device, among other examples. FIG. 4 includes representations of Track 1 and Track 2 data that can be used to transmit an alternative primary account identifier and account identifier. In one example, Track 1 data 400 can include a beginning of Track 1 data symbol "%" (405) followed by a format code field (410), a field (415) for the PAN, a separator "^" (420), and field 425 for the cardholder name (e.g., last and first name). Track 1 data 400 can additionally include a separator 430 and a discretionary field 435 that can be used to accept issuer-specific information values, followed by an end of Track 1 data field 440. Discretionary field 435 can be used for the card expiration date and other information. In one example, the OTPAN can be provided in the field 415 of the Track 1 data designated for the PAN and the account identifier can be included within the discretionary field 435 (e.g., before or after an expiration date field, among other examples). Similarly, Track 2 data 450 can also include defined fields such as a begin field 455, PAN field 460, separator 465, discretionary field 470, and end field 475. The OTPAN (or other form of alternative primary account identifier) can be encoded in the PAN field 460 in lieu of the permanent PAN and the account identifier can be included within the discretionary field 475. It should be appreciated that an alternative primary account identifier and corresponding account identifier can be sent in any format or structure to the transaction terminal. The alternative primary account identifier and corresponding account identifier can be sent and formatted in fields that have been pre-designated as data that is to be forwarded by the terminal to the corresponding card processing system (or payment device issuer) at some point during or after a transaction. The card processing system can interpret the data and resolve the alternative primary account identifier into the true, permanent primary account identifier for the account involved in the transaction.

Turning to FIG. 5, a card processing system can include data structures, such as a database that includes account data for one or more cardholder accounts. In one example, a permanent PAN can be associated with other cardholder information including cardholder name, financial institution, expiration date, credit limit, billing address, etc. This account information database can be extended through additional records in the same or a separate table, to index an account identifier ("Account ID") to the permanent PAN of the corresponding account. Secret data, such as seed data, for use in generating alternative primary account identifiers, such as OTPANs can also be stored and indexed to one or both of the permanent PAN and account identifier. For instance, a card processing system managing an account information database including records associating a permanent PAN of an account with an account identifier can receive a OTPAN and the account identifier in connection with a transaction and lookup the corresponding permanent PAN from the account identifier. The permanent PAN can be then used to identify seed data associated with the permanent PAN, as well as potentially other information instructing the card processing system on how to derive the OTPAN from the seed data secret, among other examples.

FIGS. 6A-6B are simplified block diagrams 600a-b illustrating example transactions involving an example payment device 125 that includes functionality for the generating and using alternative primary account identifiers, such as OTPANs in connection with a payment instrument hosted on the payment device. In the example of FIG. 6A, the payment device can include a smart phone 125 that includes a payment instrument module. The smart phone can be presented at a manned (or unmanned) transaction terminal 115, such as a point of sale device, as the method of payment by the smart phone's user. The payment instrument module on the smart phone 125 can communicate with the point of sale terminal 115 over an NFC channel in connection with the payment. Further, the OTPAN generation logic on the smart phone 125 (e.g., provided with the payment instrument module) can generate a OTPAN specifically for the transaction and provide this OTPAN (i.e., "OTPAN1") along with an account identifier to the terminal 125. The account identifier and seed data can be maintained in secure storage (e.g., in a Secure Element or encrypted or camouflaged data) on the smart phone 125 and the seed data can be used with a moving value to generate OTPAN1 according to a pre-agreed-upon scheme (e.g., with the card processing system 105). In some implementations, the account identifier can be a device identifier specific to the smart phone, a user identifier specific to the authorized cardholder, or another identifier for the payment instrument account. OTPAN1 and the account identifier can be sent with other card data over the NFC connection to the terminal. The terminal 115, in connection with processing the transaction, can interpret OTPAN1 as the PAN of the payment device and can send at least OTPAN1 and the account identifier to the card processing system 105 among potentially other data describing the payment device, the payment instrument's account, and the transaction, among other examples.

The card processing system 105 can receive OTPAN1 and the account identifier, in this example, a payment device-specific identifier or "card ID". The card processing system 105 can look up the permanent PAN that corresponds to the card ID and identify a scheme used for generating alternative primary account identifiers for the account. In this example, the card processing system 105 can identify a seed value mapped to the permanent PAN and use the seed value and a moving counter value to attempt to re-derive the received OTPAN (i.e., OTPAN1). If the card processing system 105 re-derives OTPAN1 it can determine that the transaction involving the payment device 125 (and corresponding payment instrument, or card) is authentic and permit the transaction to be completed, settled, etc. If the OTPAN generated by the card processing system 105 does not match the received OTPAN (OTPAN1), then the card processing system 105 can deny the transaction, report a stolen or misused account identifier (i.e., "Card ID 1"), among other examples.

The payment device 125 and payment instrument can be used in many transactions with multiple different merchants and organizations and multiple different transaction terminals. For instance, in the example of FIG. 6B, the payment instrument on the payment device 125 may next be used in a different transaction with the same or different terminal. In the example of FIG. 6B, the payment device 125 is used with a different terminal 110. In this next transaction (either with a same or different terminal), a different OTPAN (OTPAN2), can be generated and sent with the same account identifier, Card ID 1, as shown in the particular example of FIG. 6B. OTPAN2 can be generated by combining (e.g., hashing) the same secret seed data securely stored locally on the payment device 125 with the next value of the moving counter (or clock or other moving value used to generate the OTPAN). The terminal 110 can receive OTPAN2 and Card ID 1 over one or more communication interfaces, including contact or contactless chip card readers. The terminal 110 can forward at least OTPAN2 and Card ID 1 over a network to card processing system 105. Card processing system 105 can again identify the permanent PAN and seed data corresponding to the account linked to Card ID 1 and generate the next instance of the OTPAN according to the scheme assigned to the cardholder account. Again, if the OTPAN derived by the card processing system 105 matches the OTPAN received from the terminal 110 (i.e., OTPAN2), the card processing system 105 can authenticate the transaction between the payment device and terminal.

Figure 7:
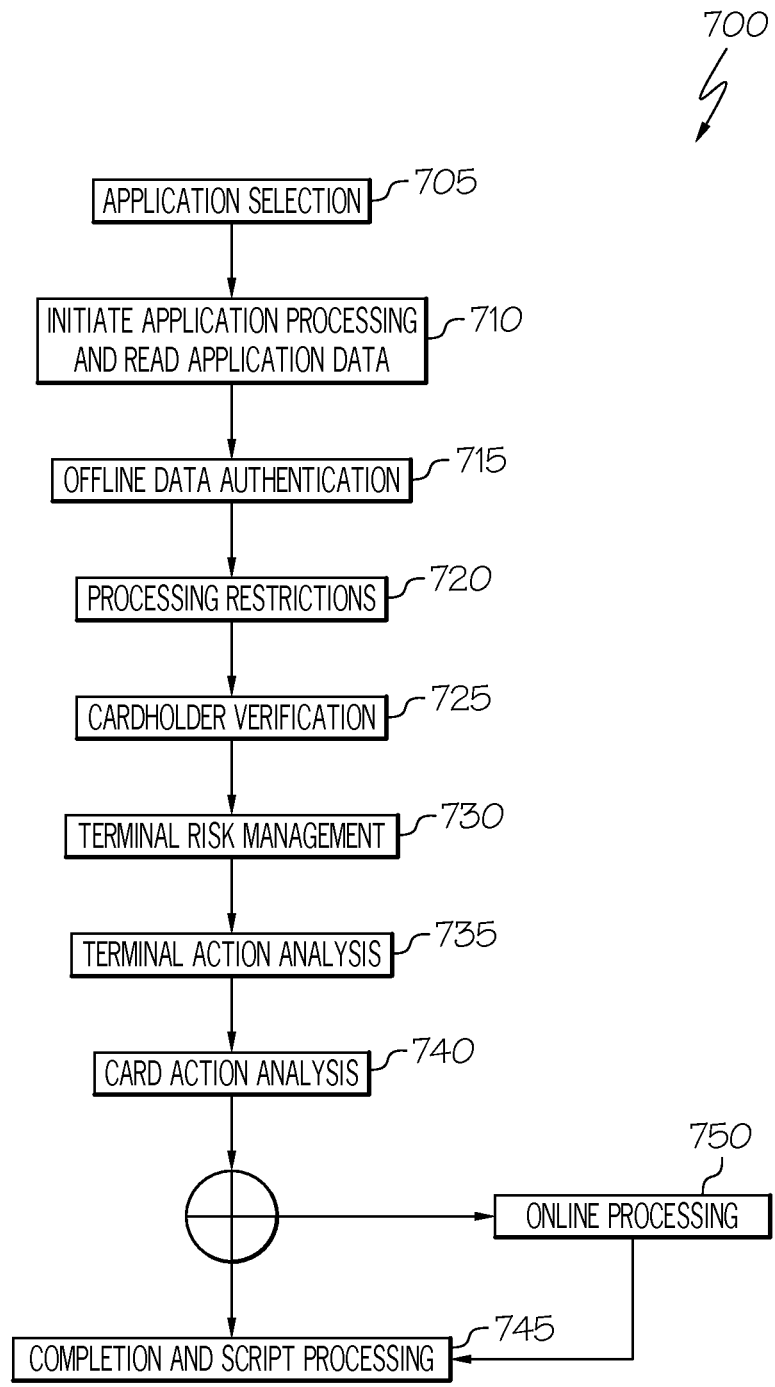
FIG. 7 is a simplified flow chart of an electronic payment protocol in accordance with at least one embodiment.

As noted above, in some implementations, a payment device and transaction terminal can exchange transaction protocol messages (e.g., over an NFC connection) in connection with a transaction using the payment instrument. An alternative primary account identifier, such as an instance of a OTPAN, can be sent by the payment device to the transaction terminal in connection with one or more messages exchanged in accordance with a transaction protocol. FIG. 7 is a simplified block diagram 700 illustrating an example protocol exchange between a payment instrument and a terminal, such as in an EMV-type protocol. In some cases, multiple applications (such as multiple EMV applications) may be supported for an instrument and the protocol can include selection (at 705) of a particular one of the applications. The payment instrument and terminal can negotiate and agree upon a common supported application and choose which to use for the transaction. In some cases, selection of the application to be used in the transaction can involve a user (e.g., of the payment device) being prompted for a selection that is to be communicated to terminal. The selected application can be initiated (at 710) and application data, including, in some instances, the alternative primary account identifier, can be provided from the payment instrument to the terminal for use by the terminal.

Restrictions can be processed (at 720) to confirm that the payment instrument (and associated account) is allowed to do the requested transaction. Application data can be checked in connection with restriction processing 720 including the application version number, application usage control (e.g., whether the card is geographically restricted, etc.), application effective or expiration date(s), etc. Cardholder verification (at 725) can also be performed to verify the cardholder. A mechanism supported by the terminal for verifying the cardholder can be agreed upon between the payment instrument and the terminal, such as a user signature, online PIN entry, offline enciphered PIN, offline plaintext PIN, "no CVM", among other examples. Terminal risk management (at 730) can be performed to conduct one or more checks to determine whether a transaction should be authorized online or offline. Such checks can include, for example, checking floor limit, among other examples. Based on results of offline data authentication, processing restrictions, cardholder verification, terminal risk management and rules in the terminal and from the chip, terminal action analysis can be performed (at 735) and the terminal can request a result of decline offline, approve offline, or go online, among other examples. Card action analysis can also be performed (at 740) based on payment instrument issuer-defined rules and limits and a response can be issued such as go online, offline decline, offline approval, etc. In the case of offline approval, for instance, the transaction can proceed to completion (at 745). In the case that the transaction goes online, online processing can be performed (at 750) before proceeding to transaction completion 745. Online processing 750 can include the terminal building an online request (e.g., including the alternative primary account identifier) to the payment instrument account issuer for authorization and online card authentication. In some cases, a response can include issuer authentication and the terminal can send the data to the payment device for verification. Further, it should be appreciated that other protocol steps including variants of the foregoing can be included or substituted for those examples discussed above.

FIGS. 8A-8B are simplified flowcharts 800a-b illustrating example techniques relating to the performance of transactions using a one-time card identifier. In the example of FIG. 8A, card data is received 805, for instance, by a card processing system from a transaction terminal, for instance, over one or more networks. The card data can include an alternative primary account identifier, such as a one-time PAN (OTPAN). The card data can also include an account identifier that corresponds to an account. The card data can include at least a portion of data received by the transaction terminal from a user payment device associated with the account, such as a chip card, smart phone, or other device. The card data can originate from the user device, such as through an electronic payment instrument implemented on the device. A permanent PAN or other account identifier can be identified 810 that is mapped to or otherwise associated with the received account identifier. A scheme for generating an alternative primary account identifier for the account can be identified, such as a scheme using secret data and a moving value to generate OTPANs. In the example of FIG. 8A, the card processing system can derive 815 a OTPAN associated with the permanent PAN, for instance, by identifying a secret seed associated with the permanent PAN's account and generating the OTPAN from the seed and a particular moving value. The derived OTPAN can then be compared 820 with the received OTPAN to determine, for instance, whether they match, indicating that the transaction terminal is engaged in an authentic transaction with the user payment device.

Turning to FIG. 8B, in some implementations, secured account data securely stored in local memory of a user payment device can be accessed 830. In some implementations, access to the secured account data can be restricted to authorized users of the payment device. In some instances, accessing 805 the secured account data can be conditioned on a user providing a password, PIN, biometric information (e.g., fingerprint, image of the user's face, retina, etc.), or other authentication information. Secured account data can include, for instance, seed data or other secret data used to generate OTPANs at the payment device and an account identifier, among other examples. Secure computer executable logic can also be stored on the payment device that can be used to generate 835 OTPANs for authorized users. The generated OTPAN can be sent 840 to a transaction terminal in connection with a transaction between the user device and the transaction terminal. The account identifier (e.g., accessed from local memory) can also be sent 845 to the transaction terminal in the transaction. Indeed, the generated OTPAN and account identifier can be sent together in card data in the transaction that can be forwarded by the transaction terminal to a corresponding card processing system that authenticates the transaction based on the OTPAN. The true PAN of the account associated with the user device can be effectively hidden from the transaction terminal as well as parties attempting to snoop the transaction and steal the permanent PAN of the account, among other examples.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method to be autonomously performed by a computer, the method comprising:
    receiving, at a card processing computer system, card data provided by an electronic payment device to a terminal device, wherein the card processing system is coupled to the terminal device by a network, the card data comprises a first one-time primary account number (PAN) generated by the electronic payment device and an account identifier in association with a transaction, and the card data further identifies a particular electronic payment protocol supported by the electronic payment device, wherein the particular electronic payment protocols is one of a plurality of different electronic payment protocols supported by the card processing computer system coupled to the terminal device by a network;
    identifying, at the card processing computer system, a permanent PAN of an account based on the account identifier;
    identifying, at the card processing computer system, seed data associated with the account;
    selecting, at the card processing computer system, a particular computer-executed hashing algorithm from a plurality of algorithms for use in deriving the first one-time PAN, wherein the particular hashing algorithm is autonomously selected by the card processing computer system based on the account identifier, and the particular hashing algorithm comprises a keyed-hash message authentication code one-time password algorithm;
    generating, at the card processing computer system, a moving value comprising a transaction counter value based on the particular electronic payment protocol;
    deriving, at the card processing computer system, a second one-time PAN associated with the permanent PAN from the seed data and the moving value using the particular hashing algorithm; and
    determining, at the card processing computer system, whether the first one-time PAN is substantially equal to the second one-time PAN associated with the permanent PAN, wherein the transaction is to be completed based at least in part on determining that the first one-time PAN matches the second one-time PAN associated with the permanent PAN.

2. The method of claim 1, wherein the card data is received from a transaction terminal included in the transaction and the permanent PAN is withheld from a transaction terminal in the transaction.

3. The method of claim 2, wherein the card data comprises at least a portion of data received by the transaction terminal in the transaction from a user device associated with the account.

4. The method of claim 1, wherein the counter value comprises an Application Transaction Counter (ATC) value when an Europay, MasterCard, Visa (EMV) payment protocol is used.

5. The method of claim 1, wherein the moving value comprises a time value.

6. The method of claim 1, wherein the one-time PAN comprises a one-time component, a bank identification number (BIN), and a checksum value.

7. The method of claim 1 wherein the one-time PAN comprises a one-time component, a bank identification number (BIN), and a checksum value, and the last four digits of the one-time PAN are to match the last four digits of the permanent PAN.

8. A non-transitory computer readable medium having program instructions stored therein, wherein the program instructions are executable by a computer system to perform operations comprising:

receiving card data provided by an electronic payment device to a terminal device, wherein the card data comprises a first one-time primary account number (PAN) generated by the electronic payment device and an account identifier in association with a transaction, and the card data further identifies a particular electronic payment protocol supported by the electronic payment device, wherein the particular electronic payment protocols is one of a plurality of different electronic payment protocols supported by a card processing computer system coupled to the terminal device by a network;

identifying a permanent PAN of an account based on the account identifier;

identifying seed data associated with the account;

selecting a particular computer-executed hashing algorithm from a plurality of algorithms for use in deriving the first one-time PAN, wherein the particular hashing algorithm is autonomously selected by the card processing computer system based on the account identifier, and the particular hashing algorithm comprises a keyed-hash message authentication code one-time password algorithm;

autonomously generating a moving value comprising a transaction counter value based on the particular electronic payment protocol;

deriving a second one-time PAN associated with the permanent PAN from the seed data and the moving value using the particular hashing algorithm; and determining whether the first one-time PAN is substantially equal to the second one-time PAN associated with the permanent PAN, wherein the transaction is to be completed based at least in part on determining that the first one-time PAN matches the second one-time PAN associated with the permanent PAN.

9. A system comprising:

at least one processor device;

a memory element;

a card processing system executable by the at least one processor device to:

receive card data provided by an electronic payment device to a terminal device, wherein the card processing system is coupled to the terminal device by a network, the card data comprises a first one-time primary account number (PAN) generated by the electronic payment device and an account identifier in association with a transaction, and the card data further identifies a particular electronic payment protocol supported by the electronic payment device, wherein the particular electronic payment protocols is one of a plurality of different electronic payment protocols supported by the card processing system;

identify a permanent PAN of an account based on the account identifier;

identify seed data associated with the account;

select a particular computer-executed hashing algorithm from a plurality of algorithms for use in deriving the first one-time PAN, wherein the particular hashing algorithm is autonomously selected by the card processing system based on the account identifier, and the particular hashing algorithm comprises a keyed-hash message authentication code one-time password algorithm;

determine a moving value comprising a transaction counter value based on the particular electronic payment protocol;

derive a second one-time PAN associated with the permanent PAN from the seed data and the moving value using the particular hashing algorithm; and determine whether the first one-time PAN is substantially equal to the second one-time PAN associated with the permanent PAN, wherein the transaction is to be completed based at least in part on determining that the first one-time PAN matches the second one-time PAN associated with the permanent PAN.

* * * * *